United States Patent
Schmitz et al.

(10) Patent No.: US 6,522,028 B1
(45) Date of Patent: Feb. 18, 2003

(54) DEVICE FOR LOCKING AND UNLOCKING A DOOR

(75) Inventors: Stephan Schmitz, Stuttgart (DE); Gianfranco Pavatich, Keilor Downs (AU); Adrian Babber, Croydon Hills (AU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,125

(22) PCT Filed: Oct. 21, 1998

(86) PCT No.: PCT/DE98/03105

§ 371 (c)(1),
(2), (4) Date: Aug. 11, 2000

(87) PCT Pub. No.: WO99/22101

PCT Pub. Date: May 6, 1999

(30) Foreign Application Priority Data

Oct. 23, 1997 (DE) ........................ 197 46 749

(51) Int. Cl.[7] .................................. B60R 1/12
(52) U.S. Cl. ......................... 307/10.5; 307/10.2
(58) Field of Search ................ 307/10.2, 10.5

(56) References Cited

U.S. PATENT DOCUMENTS

| | | | | | |
|---|---|---|---|---|---|
| 4,738,334 | A | * | 4/1988 | Weishaupt | 180/287 |
| 4,760,394 | A | * | 7/1988 | Takeuchi et al. | 340/825.54 |
| 4,873,530 | A | * | 10/1989 | Takeuchi et al. | 343/711 |
| 4,973,958 | A | * | 11/1990 | Hirano et al. | 340/825.69 |
| 5,134,392 | A | * | 7/1992 | Takeuchi et al. | 340/825.69 |
| 5,499,022 | A | * | 3/1996 | Boschini | 340/825.69 |
| 5,677,665 | A | * | 10/1997 | Amano et al. | 307/10.2 |
| 5,682,135 | A | * | 10/1997 | Labonde | 307/10.2 |
| 6,182,024 | B1 | * | 1/2001 | Geil et al. | 307/10.2 |
| 6,211,776 | B1 | * | 4/2001 | Rohrl et al. | 340/426 |

FOREIGN PATENT DOCUMENTS

| | | | |
|---|---|---|---|
| DE | 38 20 248 | 1/1989 | |
| DE | 38 44 002 | 6/1990 | |
| DE | 41 23 654 | 1/1993 | |
| DE | 44 09 167 | 3/1998 | |
| EP | 0 158 354 | 10/1985 | |
| JP | 11-321471 | * 11/1999 | ........... B60R/11/02 |

OTHER PUBLICATIONS

Motoki Hirano et al., "Keyless Entry System With Radio Card Transponder", IEEE Transactions on Industrial Electronics, vol. 35, 1988, pp. 208–216.

Von Christian Schneider et al. Ein Fahrzeugsicherungssystem ohne Mechanischen Schlussel (Vehicle Secuirty System Dispensing With Mechanical Key), atz Automobiltechnische Zeitschrift 96 (1994), pp. 321–323. English abstract attached.

* cited by examiner

Primary Examiner—Fritz M. Fleming
(74) Attorney, Agent, or Firm—Kenyon & Kenyon

(57) ABSTRACT

A device for locking and unlocking a door of an object, particularly of a motor vehicle, includes a transmitter unit disposed on the object and a transponder assigned to a user. Safety is increased because, in response to alignment of the transmission lobe with the interior of the object, the range of the field of the transmission lobe formed by the transmitter unit or of the signals emmitted by the transponder can be reduced or disturbed by a switching device, so that a transponder located in the passenger area of the interior cannot be queried.

12 Claims, 1 Drawing Sheet

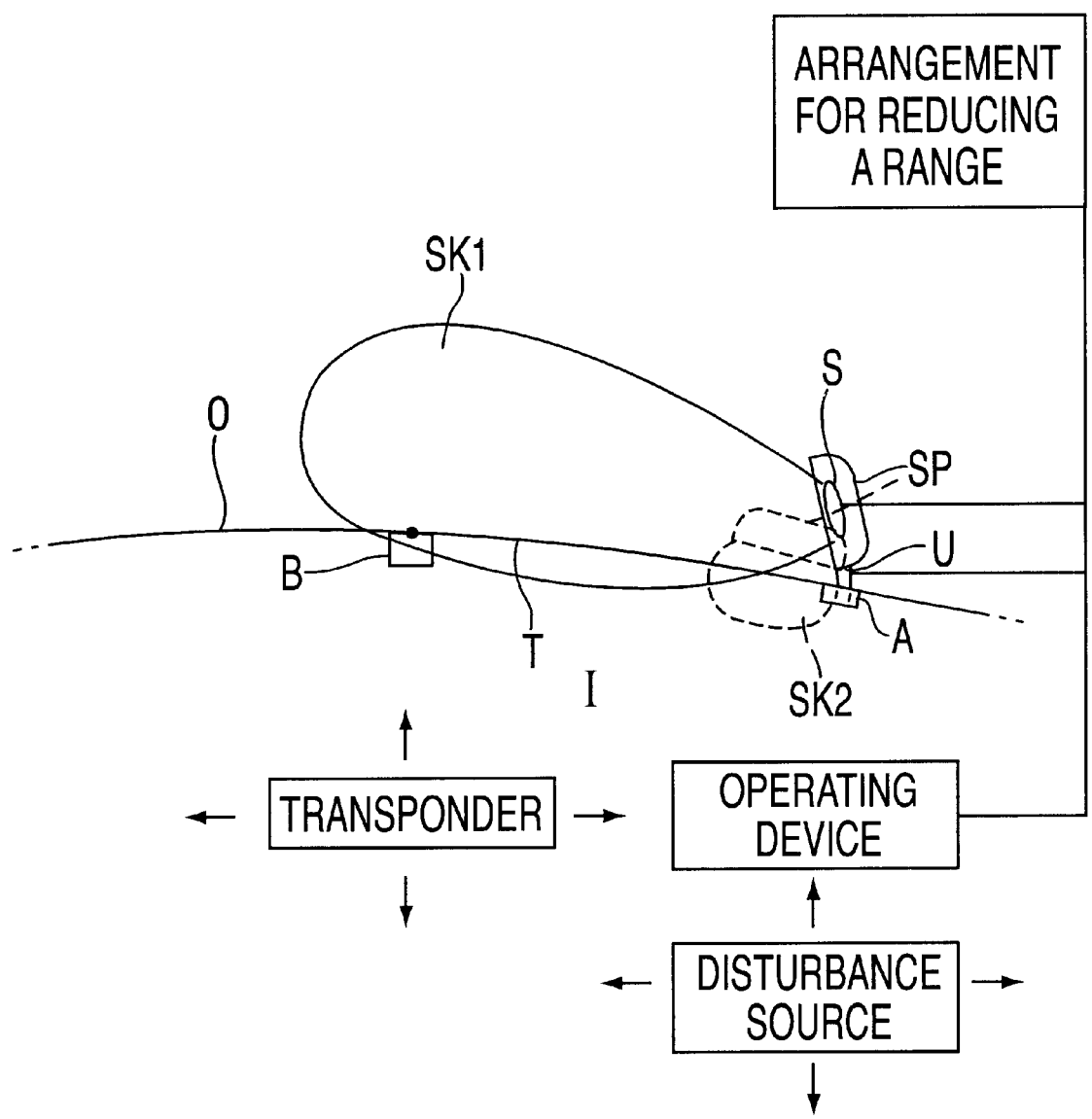

DEVICE FOR LOCKING AND UNLOCKING A DOOR

FIELD OF THE INVENTION

The present invention relates to a device for locking and unlocking a door of an object, particularly of a motor vehicle, having a transmitter unit disposed on the object and a response device transponder assigned to a user.

BACKGROUND INFORMATION

A device for keyless locking and unlocking of a door is described in "Keyless Entry System With Radio Card Transponder", Motoki Hirano et al, IEEE Transactions on Industrial Electronics, vol. 35, 1988, pp. 208 through 216. A locked door of a motor vehicle is unlocked as soon as a user who is carrying a transponder enters into the interrogation field of a transmitter unit located in the region of the door, triggers the interrogation, and the transmitter unit has recognized the code of the transponder as correct with the aid of an appropriate evaluation unit. A problem involved with such a device is that the vehicle door can be opened from the outside when the driver having the transponder is in the passenger compartment of the vehicle, although, such as when waiting in his vehicle in a parking lot, he would like to keep the door locked.

For example, if the transmitter unit is accommodated in an outside mirror, where the transmission radiation lobe normally does not reach the passenger compartment, then an attacker can pivot the outside mirror in order to direct the transmission lobe toward the transponder and unlock the door.

An object of the present invention is to provide a device with which an unwanted unlocking of the door can be reliably prevented.

SUMMARY OF THE INVENTION

According to the present invention in response to alignment of the transmission lobe with the interior of the object, the range of the field of the transmission lobe formed by the transmitter unit or of the signals emitted by the transponder can be reduced or disturbed by a switching device, so that a transponder located in the passenger area of the interior cannot be queried.

Because the range of the field of the transmission lobe or of the signals emitted by the transponder is reduced or disturbed, an interrogation of the transponder located in the passenger compartment of the motor vehicle is prevented. The door remains locked as long as the user desires.

A simple design of the device lies in the fact that the transmitter unit is disposed in an outside mirror of the motor vehicle, and that the switching device has sensor elements which function in response to an adjustment of the outside mirror in such a way that the transmission lobe is directed into the passenger compartment. With the aid of the switching device which, for example, can also be constructed electronically, the range of the field is reduced, e.g., to a few cm, so that the transponder of the occupant is not reached, or an interference source is switched on so that the transponder likewise cannot be queried.

Furthermore, in one advantageous embodiment, the sensor elements are contact elements arranged in the hinge of the outside mirror.

For example, if the transmitter unit is built into the door, then the field can be switched to the short range or the interference source can be switched on because the switching device has an operating device located in the passenger compartment which can be actuated by the user. Besides the arrangement in the mirror, suitable locations for mounting the transmitter unit are in the door or its edging.

The interrogation of the transponder in the passenger compartment can also be highly effectively prevented by arranging an interference source, whose radiating frequency corresponds to that of the transmission device, in the passenger compartment in order to disturb the field in the passenger compartment.

BRIEF DESCRIPTION OF THE DRAWING

The FIGURE shows a schematic representation of a device for locking and unlocking a door of a motor vehicle in a plan view.

DETAILED DESCRIPTION

As shown in the figure a field in the form of a transmission lobe SK1 of a transmitter unit S that is accommodated in an outside mirror SP extends essentially on the exterior in the region of a door T located between a pillar A and a pillar B of a motor vehicle O. Outside mirror SP can be folded down by a suitable hinge, so that the transmission lobe is also correspondingly swivelled toward passenger compartment I of vehicle O. Located in the hinge area of the mirror is a switching device or switchover device U which, in response to the swing-in of mirror SP, reduces transmission lobe SK1 to a transmission lobe SK2 of only a few cm, as indicated by the dotted line.

If a user, having his response unit in the form of the transponder, enters into transmission lobe SK1, and if transmitter unit S is started, such as by operating the door handle, then the transponder is queried by an evaluation unit of transmitter unit S, and if the appertaining transponder is recognized, door T is unlocked. If the user is in the vehicle, he can lock the door. In the exemplary embodiment shown, his transponder is not reached by transmission lobe SK1, so that when the door handle is operated, its code also cannot be deciphered and the door remains locked; therefore, for example, an attacker cannot break into vehicle O from the outside. On the other hand, if the attacker folds outside mirror SP into the position shown with the dotted line, then the range of the field of transmitter unit S is shortened, so that transmission lobe SK2 is formed which likewise does not reach the transponder of the occupant, and thus door T remains locked in this position of mirror SP as well.

Correspondingly, in the case of a transmission lobe installed in door T or a door edging, the field could be switched over to a short range by a switching device to be activated by the user, so that his transponder likewise is not reached and the door is kept locked, even if an interrogation is triggered by operating the door handle. Alternatively, a successful interrogation of the transponder can also be prevented by superimposing an interference field on the field in passenger compartment I with the aid of an interference source located there. An operating device operable by the user can be disposed in the passenger compartment for switching on the interference field.

Alternatively, the field of the transponder can also be reduced or disturbed, so that the communication with transmitter unit S is prevented and door T remains locked.

In principle, instead of being reduced, the field of transmitter unit S can also be completely switched off. However, this has the disadvantage that the door cannot be opened by a transponder from the outside in an emergency situation, such as if a child has locked the door from the inside by mistake.

The measures described yield a device for locking and unlocking a door which is simple to operate and meets high safety requirements.

What is claimed is:

1. A device for locking and unlocking a door of a motor vehicle, comprising:

a transmitter unit situated on the motor vehicle for generating a field;

a transponder assigned to a user for emitting signals;

a switching device; and means for one of reducing and disturbing, in response to an alignment of a transmission lobe of the transmitter unit with an interior of the motor vehicle and in response to an actuation of the switching device, a range of the generated field of the transmission lobe formed by the transmitter unit to an extent that an interrogation dialogue of the transponder located in a passenger area of the interior is prevented.

2. The device according to claim 1, wherein the transmitter unit is situated in one of a door of the motor vehicle and an edging of the door.

3. A device for locking and unlocking a door of a motor vehicle, comprising:

a transmitter unit situated on the motor vehicle for generating a field;

a transponder assigned to a user for emitting signals;

a switching device; and means for one of reducing and greatly disturbing, in response to an alignment of a transmission lobe of the transmitter unit with an interior of the motor vehicle and in response to an actuation of the switching device, a range of a generated field of the signals emitted by the transponder to an extent that an interrogation dialogue of the transponder located in a passenger area of the interior is prevented.

4. The device according to claim 3, wherein the transmitter unit is situated in one of a door of the motor vehicle and an edging of the door.

5. A device for locking and unlocking a door of a motor vehicle, comprising:

a transmitter unit situated on the motor vehicle for generating a field;

a transponder assigned to a user for emitting signals;

a switching device; and means for one of reducing and disturbing, in response to an alignment of a transmission lobe of the transmitter unit with an interior of the motor vehicle and in response to an actuation of the switching device, a range of the generated field of the transmission lobe formed by the transmitter unit to an extent that an interrogation dialogue of the transponder located in a passenger area of the interior is prevented, wherein the transmitter unit is situated in an outside mirror of the motor vehicle, and the switching device includes sensor elements which, in response to an adjustment of the outside mirror, operate so that the transmission lobe is directed into the passenger area.

6. The device according to claim 5, wherein the sensor elements are contact elements situated in a hinge of the outside mirror.

7. A device for locking and unlocking a door of a motor vehicle, comprising:

a transmitter unit situated on the motor vehicle for generating a field;

a transponder assigned to a user for emitting signals;

a switching device; and means for one of reducing and disturbing, in response to an alignment of a transmission lobe of the transmitter unit with an interior of the motor vehicle and in response to an actuation of the switching device, a range of the generated field of the transmission lobe formed by the transmitter unit to an extent that an interrogation dialogue of the transponder located in a passenger area of the interior is prevented, wherein the switching device includes an operating device, situated in the passenger area, which is operable by the user.

8. A device for locking and unlocking a door of a motor vehicle, comprising:

a transmitter unit situated on the motor vehicle for generating a field;

a transponder assigned to a user for emitting signals;

a switching device;

means for one of reducing and disturbing, in response to an alignment of a transmission lobe of the transmitter unit with an interior of the motor vehicle and in response to an actuation of the switching device, a range of the generated field of the transmission lobe formed by the transmitter unit to an extent that an interrogation dialogue of the transponder located in a passenger area of the interior is prevented; and a disturbance source situated in the passenger area and having a radiating frequency corresponding to a radiating frequency of the transmitter unit, in order to disturb the field.

9. A device for locking and unlocking a door of a motor vehicle, comprising:

a transmitter unit situated on the motor vehicle for generating a field;

a transponder assigned to a user for emitting signals;

a switching device; and means for one of reducing and greatly disturbing, in response to an alignment of a transmission lobe of the transmitter unit with an interior of the motor vehicle and in response to an actuation of the switching device, a range of a generated field of the signals emitted by the transponder to an extent that an interrogation dialogue of the transponder located in the passenger area of the interior is prevented, wherein the transmitter unit is situated in an outside mirror of the motor vehicle, and the switching device includes sensor elements which, in response to an adjustment of the outside mirror, operate so that the transmission lobe is directed into the passenger area.

10. The device according to claim 9, wherein the sensor elements are contact elements situated in a hinge of the outside mirror.

11. A device for locking and unlocking a door of a motor vehicle, comprising:

a transmitter unit situated on the motor vehicle for generating a field;

a transponder assigned to a user for emitting signals;

a switching device; and means for one of reducing and greatly disturbing, in response to an alignment of a transmission lobe of the transmitter unit with an interior of the motor vehicle and in response to an actuation of the switching device, a range of a generated field of the signals emitted by the transponder to an extent that an interrogation dialogue of the transponder located in a passenger area of the interior is prevented, wherein the switching device includes an operating device, situated in the passenger area, which is operable by the user.

12. A new device for locking and unlocking a door of a motor vehicle, comprising:

a transmitter unit situated on the motor vehicle for generating a field;

a transponder assigned to a user for emitting signals;

a switching device;

means for one of reducing and greatly disturbing, in response to an alignment of a transmission lobe of the transmitter unit with an interior of the motor vehicle and in response to an actuation of the switching device, a range of a generated field of the signals emitted by the transponder to an extent that an interrogation dialogue of the transponder located in a passenger area of the interior is prevented; and a disturbance source situated in the passenger area and having a radiating frequency corresponding to a radiating frequency of the transmitter unit, in order to disturb the field.

* * * * *

UNITED STATES PATENT AND TRADEMARK OFFICE
CERTIFICATE OF CORRECTION

PATENT NO.   : 6,522,028 B1
DATED        : February 18, 2003
INVENTOR(S)  : Schmitz et al.

It is certified that error appears in the above-identified patent and that said Letters Patent is hereby corrected as shown below:

Title page,
Item [57], ABSTRACT,
Line 7, change "emmitted" to -- emitted --.

Column 1,
Line 29, change "radiation lobe" to -- (radiation) lobe --
Line 39, change "invention in" to -- invention, in --

Column 2,
Line 20, change "figure a field" to -- figure, a field --

Column 3,
Line 4, insert the following two paragraphs:

--Also shown in the figure is a transponder situated in the passenger compartment of vehicle O. Since the transponder is mobile, the transponder may also be outside vehicle O, or in any number of alternative positions. The transponder may emit signals which may be received by transmitter unit S. Also shown in the figure is a disturbance source situated in the passenger compartment. Also shown in the figure is a box representing an arrangement for reducing a range, which is connected to an operating device, switch-over device U, and transmitter unit S. Alternative methods of connecting the elements shown in the figure are also possible, and all of the elements shown may not be necessary to operate the present invention.

The transponder may be assigned to a user for emitting signals. The arrangement for reducing a range may operate in response to an alignment of a transmission lobe of transmitter unit S with interior I of motor vehicle O and in response to an actuation of switching device U and may operate to reduce a range of the generated field of the transmission lobe formed by transmitter unit S. The arrangement for reducing a range may operate to an extent that an interrogation dialogue of the transponder located in a passenger area of interior I may be prevented. Switching device U may include sensor elements which, in response to an adjustment of outside mirror SP, operate so that the

UNITED STATES PATENT AND TRADEMARK OFFICE
CERTIFICATE OF CORRECTION

PATENT NO. : 6,522,028 B1
DATED : February 18, 2003
INVENTOR(S) : Schmitz et al.

It is certified that error appears in the above-identified patent and that said Letters Patent is hereby corrected as shown below:

Column 3, (continued)

transmission lobe is directed into the passenger area. The sensor elements may be contact elements situated in a hinge of the outside mirror. Switching device U may include an operating device, situated in the passenger area, which is operable by the user. A disturbance source may be situated in the passenger area and may have a radiating frequency corresponding to a radiating frequency of transmitter unit S in order to disturb the field."--

Signed and Sealed this

Seventeenth Day of August, 2004

JON W. DUDAS
*Acting Director of the United States Patent and Trademark Office*